United States Patent
Zhang et al.

(10) Patent No.: US 11,455,276 B2
(45) Date of Patent: Sep. 27, 2022

(54) METHOD FOR PROCESSING SNAPSHOTS AND DISTRIBUTED BLOCK STORAGE SYSTEM

(71) Applicant: ZTE CORPORATION, Guangdong (CN)

(72) Inventors: Guangyan Zhang, Guangdong (CN); Shengmei Luo, Guangdong (CN); Tao Du, Guangdong (CN); Hongzhang Yang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 532 days.

(21) Appl. No.: 16/487,820

(22) PCT Filed: Feb. 6, 2018

(86) PCT No.: PCT/CN2018/075458
§ 371 (c)(1),
(2) Date: Aug. 21, 2019

(87) PCT Pub. No.: WO2018/153251
PCT Pub. Date: Aug. 30, 2018

(65) Prior Publication Data
US 2021/0133146 A1    May 6, 2021

(30) Foreign Application Priority Data
Feb. 21, 2017 (CN) .......................... 201710091836.0

(51) Int. Cl.
*G06F 16/11* (2019.01)
*G06F 16/182* (2019.01)
*G06F 11/14* (2006.01)

(52) U.S. Cl.
CPC ........ *G06F 16/128* (2019.01); *G06F 11/1402* (2013.01); *G06F 16/1844* (2019.01)

(58) Field of Classification Search
None
See application file for complete search history.

(56) References Cited

U.S. PATENT DOCUMENTS 8,239,584 B1 * 8/2012 Rabe ..................... G06F 3/0605
711/170
9,235,535 B1  1/2016 Shim et al.
(Continued)

FOREIGN PATENT DOCUMENTS

CN    101183383 A    5/2008
CN    101482838 A    7/2009
(Continued)

OTHER PUBLICATIONS

European Patent Office, Supplementary European Search Report dated Nov. 19, 2020 corresponding to EP Application No. 18757805.9.
(Continued)

*Primary Examiner* — Neveen Abel Jalil
*Assistant Examiner* — John J Morris (57) ABSTRACT

A method for processing snapshots and a distributed block storage system, the method including: acquiring the number of read operations and the number of read/write operations for a data block in a distributed block storage system; on the basis of the number of read operations and the number of read/write operations, determining a target snapshot manner, wherein the target snapshot manner includes copying while writing or re-orienting while writing; on the basis of the target snapshot manner, performing a snapshot operation on the data block in the distributed block storage system.

11 Claims, 5 Drawing Sheets

(56) References Cited

U.S. PATENT DOCUMENTS

| | | |
|---|---|---|
| 2006/0206677 A1 | 9/2006 | Kim et al. |
| 2011/0178972 A1* | 7/2011 | Navarro ............. G06F 11/3419 |
| | | 706/47 |
| 2012/0324185 A1 | 12/2012 | Nonaka |
| 2015/0309745 A1 | 10/2015 | Wilkinson |
| 2021/0133146 A1 | 5/2021 | Zhang et al. |

FOREIGN PATENT DOCUMENTS

| | | |
|---|---|---|
| CN | 102971698 A | 3/2013 |
| WO | WO2010/042109 A1 | 4/2010 |

OTHER PUBLICATIONS

WIPO, International Search Report dated Apr. 26, 2018.
Australia Patent Office, Office Action dated Jul. 1, 2020 corresponding to AU Application No. 15890374.0.
Examination Report of Counterpart Australian Patent Application No. 2021204579 dated Jul. 18, 2022.

* cited by examiner

METHOD FOR PROCESSING SNAPSHOTS AND DISTRIBUTED BLOCK STORAGE SYSTEM

CROSS-REFERENCE TO RELATED APPLICATIONS

This is a National Phase Application filed under 35 U.S.C. 371 as a national stage of PCT/CN2018/075458, filed on Feb. 6, 2018, an application claiming the priority of Chinese Patent Application No. 201710091836.0, filed on Feb. 21, 2017, the contents of which are incorporated herein in their entirety by reference.

FIELD OF THE INVENTION

The present disclosure relates to, but is not limited to, the field of communication technology, particularly to a method for processing snapshots and a distributed block storage system.

BACKGROUND OF THE INVENTION

Distributed block storage system is widely used in scenarios such as cloud storage, high performance computing, device virtualization and the like, for its characteristics of reliable, efficient, extendable, interface flexible and the like. A typical distributed storage system usually includes three parts of client, metadata server and data server. Snapshot technology provides storage systems with functions of online backup, data recovery and data reuse and the like, and is deemed as an essential part of the distributed block storage system.

SUMMARY OF THE INVENTION

The following is an overview of subjects described in detail in the specification. This overview is not intended to limit the protection scope of claims.

Embodiments of the present disclosure provide a method for processing snapshots and a distributed block storage system.

An embodiment of the present disclosure provides a method for processing snapshots, including: acquiring number of read operations and number of read/write operations for data block in a distributed block storage system; determining a target snapshot manner based on the number of read operations and the number of read/write operations, wherein the target snapshot manner includes Copy On Write or Redirect On Write; and performing a snapshot operation on the data block in the distributed block storage system based on the target snapshot manner.

An embodiment of the present disclosure further provides a distributed block storage system including: a data acquiring module configured to acquire number of read operations and number of read/write operations for data block in the distributed block storage system; a snapshot manner determining module configured to determine a target snapshot manner based on the number of read operations and the number of read/write operations, wherein the target snapshot manner includes Copy On Write or Redirect On Write; and a processing module configured to perform a snapshot operation on the data block in the distributed block storage system based on the target snapshot manner.

An embodiment of the present disclosure further provides a computer readable medium storing one or more computer executable programs therein, when the one or more programs are executed in a computer, the computer performs the method for processing snapshots provided as above.

The embodiments of the present disclosure have the following advantages or effects.

According to the steps of acquiring number of read operations and number of read/write operations for data block in a distributed block storage system; determining a target snapshot manner based on the number of read operations and the number of read/write operations, wherein the target snapshot manner includes Copy On Write or Redirect On Write; and performing a snapshot operation on the data block in the distributed block storage system based on the target snapshot manner, during snapshots of the distributed storage system, when the data block is being read mostly, the snapshot operation on the data block is performed with Copy On Write; and when the data block is being write mostly, the snapshot operation on the data block is performed with Redirect On Write, therefore, the write-in performance, rollback performance, and read performance are all good.

Other objects of the present disclosure can be understood after reading and comprehending the accompanying drawings and the detailed description.

DETAILED DESCRIPTION OF THE EMBODIMENTS

Hereinafter, a detailed description is provided in combination with the accompanying drawings and specified embodiments.

Figure 1:
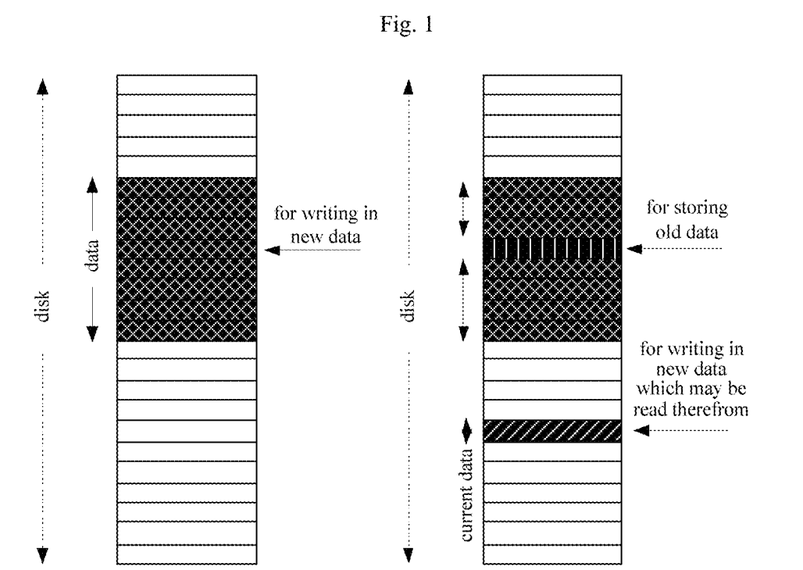
FIG. 1 is a schematic diagram of Copy On Write snapshot.
Figure 2:
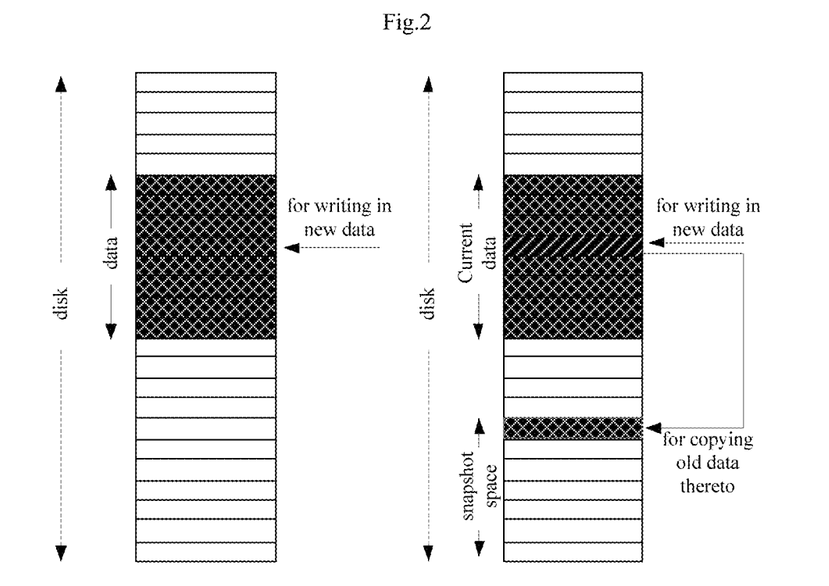
FIG. 2 is a schematic diagram of Redirect On Write snapshot.

As shown in FIGS. 1 and 2, a distributed block storage system usually uses two snapshot manners of Copy On Write (COW) and Redirect On Write (ROW). COW is better at read performance, while ROW is better at write performance and rollback performance. However, data should be copied firstly when write and rollback operations are to be performed with COW, thus COW is not good at write performance and rollback performance; and data should be redirected when read operation is to be performed with ROW, thus ROW is not good at read performance.

Figure 3:
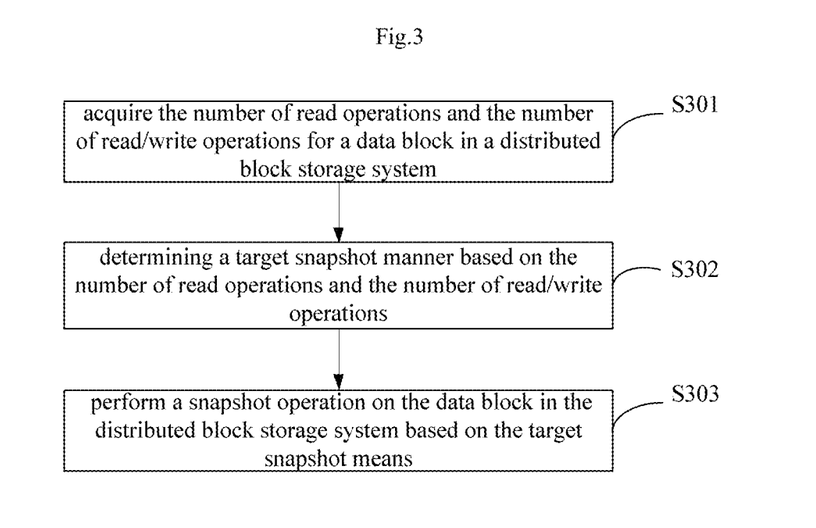
FIG. 3 is a schematic flow chart of a method for processing snapshots provided according to an embodiment of the present disclosure.

As shown in FIG. 3, which is a schematic flow chart of a method for processing snapshots provided according to an embodiment of the present disclosure, the method is applicable to a distributed block storage system, and includs the steps of S301 to S303.

At step S301, acquiring the number of read operations and the number of read/write operations for a data block in the distributed block storage system.

In the embodiment of the present disclosure, the distributed storage system may acquire the number of read operations and the number of read/write operations for each of data blocks by a disk operating monitoring tool. For example, an iostat command is inputted into the distributed storage system, load data, such as input/output operations per second (IOPS) etc., of a data server storing the data block is recorded in real time, to acquire the number of read operations and the number of read/write operations for the data block.

At step S302, determining a target snapshot manner based on the number of read operations and the number of read/write operations, wherein the target snapshot manner corresponds to Copy On Write or Redirect On Write.

In an embodiment of the present disclosure, since COW is better at read performance, and ROW is better at write performance and rollback performance, read and write situations of the data block may be determined according to the number of read operations and the number of read/write operations for the data block. If it is determined that the data block is being read at most time, the snapshot manner of snapshot operation on the data block may be COW; and if it is determined that the data block is being write-in at most time, the snapshot manner of snapshot operation on the data block may be ROW.

In the description above, the target snapshot manner is determined based on the number of read operations and the number of read/write operations. The target snapshot manner may be determined according to a ratio of the number of read operations and the number of read/write operations for the data block or a difference between the number of read operations and the number of read/write operations for the data block, when the ratio or the difference is large, the data block is determined being read mostly; when the ratio or the difference is small, the data block is determined being write-in mostly. For example, if the ratio of the number of read operations and the number of read/write operations is 10, it is determined that the data block is being read mostly, and the target snapshot manner may be COW; if the ratio of the number of read operations and the number of read/write operations is 0.1, it is determined that the data block is being write-in mostly, and the target snapshot manner may be ROW.

At step S303, performing a snapshot operation on the data block in the distributed block storage system based on the target snapshot manner.

In an embodiment of the present disclosure, during the determination of the target snapshot manner in the above step S302, the distributed storage system may perform a snapshot operation on the data block with the target snapshot manner. Herein, the above mentioned snapshot operation may include any one of snapshot create operation, read operation, write operation, rollback operation, snapshot delete operation, and the like.

In an embodiment of the present disclosure, the number of read operations and the number of read/write operations for the data block in the distributed block storage system is acquired; the target snapshot manner is determined based on the number of read operations and the number of read/write operations, wherein the target snapshot manner includes Copy On Write or Redirect On Write; and a snapshot operation is performed based on the target snapshot manner for the data block in the distributed block storage system. In this way, in consideration of snapshots in the distributed storage system, when the data block is being read at most time, the snapshot operation on the data block is performed with Copy On Write; and when the data block is being write-in at most time, the snapshot operation on the data block is performed with Redirect On Write, therefore, the system is good at write-in performance, rollback performance, and read performance all at the same time.

Figure 4:
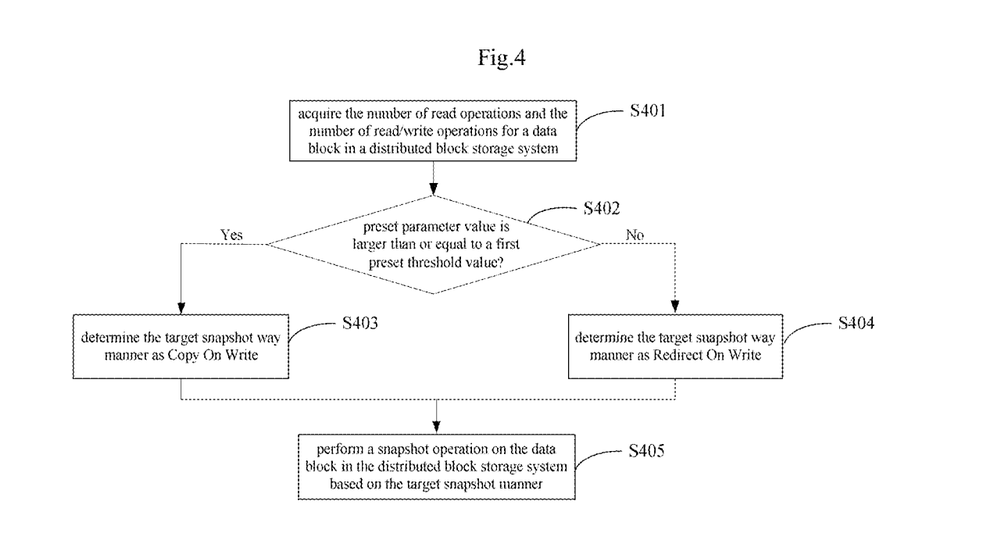
FIG. 4 is a schematic flow chart of another method for processing snapshots provided according to an embodiment of the present disclosure.

As shown in FIG. 4, which is a schematic flow chart of another method for processing snapshots provided according to an embodiment of the present disclosure, the method includes the steps of S401 to S405.

At step S401, acquiring the number of read operations and the number of read/write operations for a data block in a distributed block storage system.

In the embodiment of the present disclosure, when a snapshot operate request is sent by a client, in respond to the request, the distributed block storage system finds, in a data server, position of the data block corresponding to the snapshot operate request, by using snapshot metadata stored in a metadata server; and acquires the number of read operations and the number of read/write operations for each of the data blocks by a disk operating monitoring tool. For example, load data, such as IOPS etc., of the data server storing the data block is recorded with an iostat command, to acquire the number of read operations and the number of read/write operations for the data block.

At step S402, determining whether a preset parameter value of the number of read operations and the number of read/write operations is larger than or equal to a first preset threshold value, wherein the preset parameter value is a ratio of the number of read operations and the number of read/write operations or a difference between the number of read operations and the number of read/write operations.

In an embodiment of the present disclosure, the ratio of the number of read operations and the number of read/write operations or the difference between the number of read operations and the number of read/write operations is taken as the preset parameter value, and it directly reflects read and write situations of the data block. If the ratio of the number of read operations and the number of read/write operations or the difference between the number of read operations and the number of read/write operations is large, read operations are mostly performed on the data block; if the ratio of the number of read operations and the number of read/write operations or the difference between the number of read operations and the number of read/write operations is small, write-in operations are mostly performed on the data block.

Herein, if the ratio of the number of read operations and the number of read/write operations or the difference between the number of read operations and the number of read/write operations is larger than or equal to the first preset threshold value, it may be determined that the data block is being read mostly. For example, when the preset parameter value is the ratio of the number of read operations and the number of read/write operations, the first preset threshold value may be set to 1.5, and if the preset parameter value is larger than or equal to 1.5, it may be determined that the data block is being read mostly; when the preset parameter value is the difference between the number of read operations and the number of read/write operations, the first preset threshold value may be set to 50, and if the preset parameter value is larger than or equal to 50, it may be determined that the data block is being read mostly.

At step S403, if the preset parameter value of the number of read operations and the number of read/write operations is larger than or equal to the first preset threshold value, it is determined that the target snapshot manner is Copy On Write.

In an embodiment of the present disclosure, when it is determined that the preset parameter value of the number of read operations and the number of read/write operations is larger than or equal to the first preset threshold value in step S402, it may be determined that the data block is being read mostly, and the target snapshot manner is Copy On Write which is better in read performance, thus the distributed storage system is better in read performance.

At step S404, if the preset parameter value of the number of read operations and the number of read/write operations is less than the first preset threshold value, it is determined that the target snapshot manner is Redirect On Write.

In an embodiment of the present disclosure, when it is determined that the preset parameter value of the number of read operations and the number of read/write operations is less than the first preset threshold value in step S402, it may be determined that the data block is not being read mostly, that is, the data block is being read as much as being write-in or is being write-in mostly, and the target snapshot manner is Redirect On Write which is better in write performance and rollback performance, thus the distributed storage system is better in write performance and rollback performance.

Optionally, before determining the target snapshot manner as Redirect On Write, the method further includes: determining whether the preset parameter value of the number of read operations and the number of read/write operations is larger than a second preset threshold value, wherein the second preset threshold value is less than the first preset threshold value; if the preset parameter value of the number of read operations and the number of read/write operations is larger than the second preset threshold value, determining whether a front-end load value is larger than a preset load threshold value, wherein the front-end load value is the load value of the data server storing the data block; if the front-end load value is less than or equal to the preset load threshold value, determining the target snapshot manner as Copy On Write; if the front-end load value is larger than the preset load threshold value, or the preset parameter value of the number of read operations and the number of read/write operations is less than or equal to the second preset threshold value, performing the step of determining the target snapshot manner as Redirect On Write.

In an embodiment of the present disclosure, when the preset parameter value of the number of read operations and the number of read/write operations for the data block is less than or equal to the second preset threshold value, it may be determined that the data block is being write-in mostly, and the target snapshot manner is Redirect On Write which is better in write performance and rollback performance; when the preset parameter value of the number of read operations and the number of read/write operations for the data block is less than the first preset threshold value but larger than the second preset threshold value, it may be determined that the data block is being read as much as being write-in.

Herein, the following steps may be performed in order to secure that the distributed block storage system has good write-in performance, rollback performance and read performance when the data block is being read as much as being write-in: acquiring the front-end load value of the data server storing the data block; and comparing the front-end load value with the preset load threshold value, if the front-end load value is larger than the preset load threshold value, which means that the data server has high load, the target snapshot manner may be determined as ROW, to decrease the write request overhead of the data block; and if the front-end load value is less than or equal to the preset load threshold value, which means that the data server has low load, the target snapshot manner may be determined as COW, to increase the read request performance of the data block.

As an example, when the preset parameter value is the ratio of the number of read operations and the number of read/write operations, the first preset threshold value may be set to 1.5, the second preset threshold value to 0.7, and the preset load threshold value to 10000; if the ratio of the number of read operations and the number of read/write operations is less than or equal to 0.7, which means that the data block is being write mostly, the target snapshot manner may be determined as ROW; if the ratio of the number of read operations and the number of read/write operations is larger than 0.7 but less than 1.5, which means that the data block is being read as much as being write-in, the target snapshot manner may be determined to be ROW when the front-end load value of the data server is 15000.

It should be noted that the above mentioned first preset threshold value, the second preset threshold value and the preset load threshold value may be set in advance as actual necessary, and are not limited thereto.

At step S405, performing a snapshot operation on the data block in the distributed block storage system based on the target snapshot manner.

In an embodiment of the present disclosure, when the target snapshot manner is determined, the distributed storage system may perform a snapshot operation on the data block with the target snapshot manner.

Optionally, before the above step S405, the method further includes: determining whether a present snapshot manner corresponds to the target snapshot manner; and if the present snapshot manner does not correspond to the target snapshot manner, switching the present snapshot manner to the target snapshot manner.

In an embodiment of the present disclosure, when the target snapshot manner is determined, the distributed storage system may compare the target snapshot manner with the present snapshot manner of the data block, if the target snapshot manner does not correspond to the present snapshot manner, the present snapshot manner may be switched to the target snapshot manner. As an example, if the present snapshot manner is COW, and the target snapshot manner is ROW, the present snapshot manner of the data block may be switched from COW to ROW; if the present snapshot manner is ROW, and the target snapshot manner is COW, the present snapshot manner of the data block may be switched from ROW to COW.

Optionally, the above snapshot operation includes any one of snapshot create operation, read operation, write operation, rollback operation, and snapshot delete operation, such that the distributed storage system has good write-in performance, rollback performance, and read performance in any one of the snapshot operations.

Figure 5:
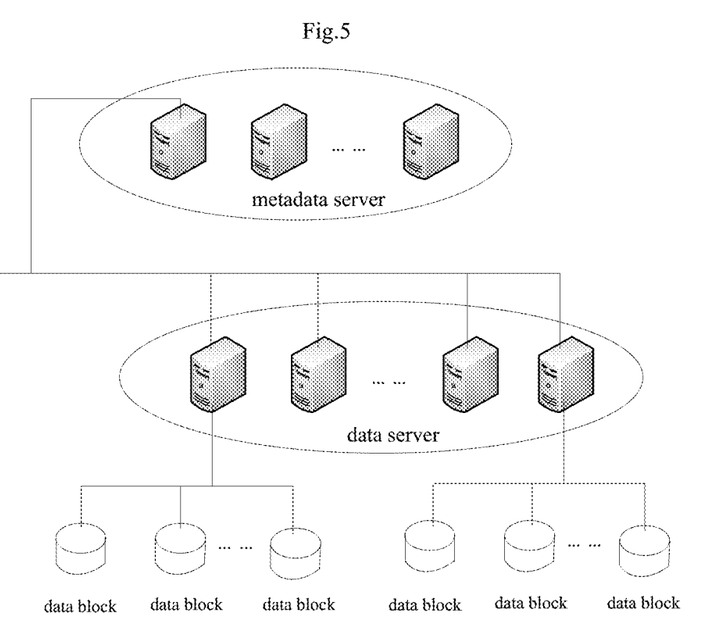
FIG. 5 is a schematic diagram of partial architecture of a distributed block storage system according to an embodiment of the present disclosure.

In an embodiment of the present disclosure, a description is made hereinafter base on a case in which, by way of example, the above snapshots processing method is actually applied to read operation, write operation, rollback operation, and snapshot delete operation. Herein, as shown in FIG. 5, a distributed storage system includes a plurality of metadata servers and data servers. Each of the data servers includes a plurality of data blocks, which are minimum memory cells in the distributed storage system. Snapshot metadata of the distributed storage system is stored in the metadata servers, and snapshot metadata information of the data blocks in the distributed storage system is stored in the data server in which the data blocks are included.

Herein, present data and snapshot data of the data block are stored as files under same directory of the data server, snapshot files, data files for a case of COW snapshot manner and data files for a case of ROW snapshot manner have different naming formats. As an example, naming format of snapshot file is data block id+"_"+snap_id; naming format of data file for the case of COW snapshot manner is data block id+"_"+"head"; naming format of data file for the case of ROW snapshot manner is id+"_"+"head_id". In addition, when data files are operated with COW snapshot manner, the file names may be created directly, without searching or calculating positions of data blocks; when data files are operated with ROW snapshot manner, head_id is read from snapshot metadata information, to create file names of data files, and perform IO operations.

In a case where the snapshot operation is a snapshot create operation, the distributed block storage system sends a snapshot create request to a data server in which the corresponding data block is included; determines a target snapshot manner of the data block based on the number of read operations, the number of read/write operations, and the front-end load value of the data block; sets the present snapshot manner to the target snapshot manner; creates snapshots with the present snapshot manner; and updates snapshot metadata information of the data block.

In a case where the snapshot operation is a read operation for reading data, the distributed block storage system sends a read request to a data server in which the corresponding data block is included; determines a target snapshot manner of the data block based on the number of read operations, the number of read/write operations, and the front-end load value of the data block; sets the present snapshot manner to the target snapshot manner; creates file name of data file corresponding to the target snapshot manner; and acquires the data file from data directory of the data block using property of corresponding relationship between snapshot number of the snapshot metadata information and snapshot file.

In a case where the snapshot operation is a write-in operation for writing data, the distributed block storage system sends a write request to a data server in which the corresponding data block is included; determines a target snapshot manner of the data block based on the number of read operations, the number of read/write operations, and the front-end load value of the data block; sets the present snapshot manner to the target snapshot manner; performs copy on write or redirect on write with the present snapshot manner, and updates snapshot metadata information of the data block.

In a case where the snapshot operation is a rollback operation, the distributed block storage system sends a rollback request to a data server in which the corresponding data block is included; determines a target snapshot manner of the data block based on the number of read operations, the number of read/write operations, and the front-end load value of the data block; sets the present snapshot manner to the target snapshot manner, performs copy rollback or modifies pointers directly with the present snapshot manner; and updates snapshot metadata information of the data block.

In a case where the snapshot operation is a snapshot delete operation, the distributed block storage system sends a snapshot delete request to a data server in which the corresponding data block is included; determines a target snapshot manner of the data block based on the number of read operations, the number of read/write operations, and the front-end load value of the data block; sets the present snapshot manner to the target snapshot manner; determines whether corresponding real snapshot file needs to be deleted, if so, deletes the snapshot file; and updates snapshot metadata information of the data block.

In an embodiment of the present disclosure, a ratio of the number of read operations and the number of read/write operations of the data block or a difference between the number of read operations and the number of read/write operations of the data block is compared with a first preset threshold value and a second preset threshold value, if the ratio or the difference is larger than or equal to the first preset threshold value, the snapshot manner with which the data block performs snapshot operation is determined to be COW; if the ratio or the difference is less than or equal to the second preset threshold value, the snapshot manner with which the data block performs snapshot operation is determined to be ROW. If the ratio or the difference is larger than the second preset threshold value and less than the first preset threshold value, determining whether a front-end load value of the data server storing the data block is larger than a preset load threshold value or not, if the front-end load value is larger than the preset load threshold value, the snapshot manner with which the data block performs snapshot operation is determined to be ROW; and if the front-end load value is less than or equal to the preset load threshold value, the snapshot manner with which the data block performs snapshot operation is determined to be COW. In this way, during snapshots of the distributed storage system, the write-in performance, rollback performance, and read performance may be all good.

Figure 6:
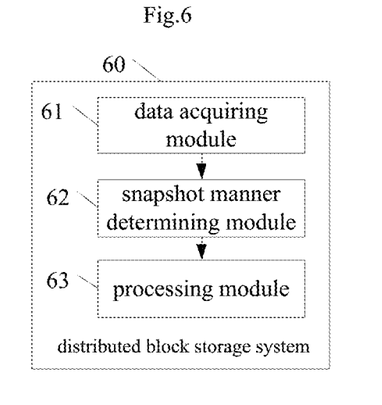
FIG. 6 is a structural schematic diagram of a distributed block storage system according to an embodiment of the present disclosure.

As shown in FIG. 6, an embodiment of the present disclosure provides a structural schematic diagram of a distributed block storage system, the distributed block storage system 60 includes: a data acquiring module 61 configured to acquiring number of read operations and number of read/write operations for data block in the distributed block storage system; a snapshot manner determining module 62 configured to determining a target snapshot manner based on the number of read operations and the number of read/write operations, wherein the target snapshot manner includes Copy On Write or Redirect On Write; and a processing module 63 configured to performing a snapshot operation on the data block in the distributed block storage system based on the target snapshot manner.

Figure 7:
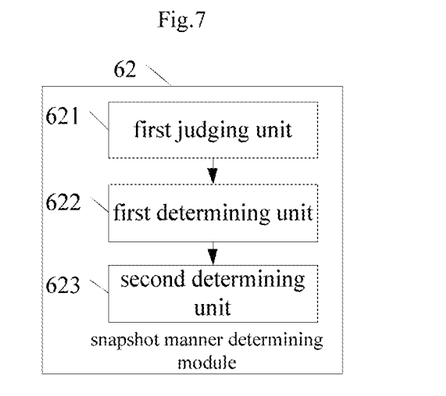
FIG. 7 is a structural schematic diagram of a snapshot manner determining module in a distributed block storage system according to an embodiment of the present disclosure.

Optionally, as shown in FIG. 7, the snapshot manner determining module 62 may include: a first judging unit 621 configured to determine whether a preset parameter value of the number of read operations and the number of read/write operations is larger than or equal to a first preset threshold value, wherein the preset parameter value is a ratio of the number of read operations and the number of read/write operations or a difference between the number of read operations and the number of read/write operations; a first determining unit 622 configured to determine the target snapshot manner as Copy On Write, when the preset parameter value of the number of read operations and the number of read/write operations is larger than or equal to the first preset threshold value; and a second determining unit 623 configured to determine the target snapshot manner as Redirect On Write, when the preset parameter value of the number of read operations and the number of read/write operations is less than the first preset threshold value.

Figure 8:
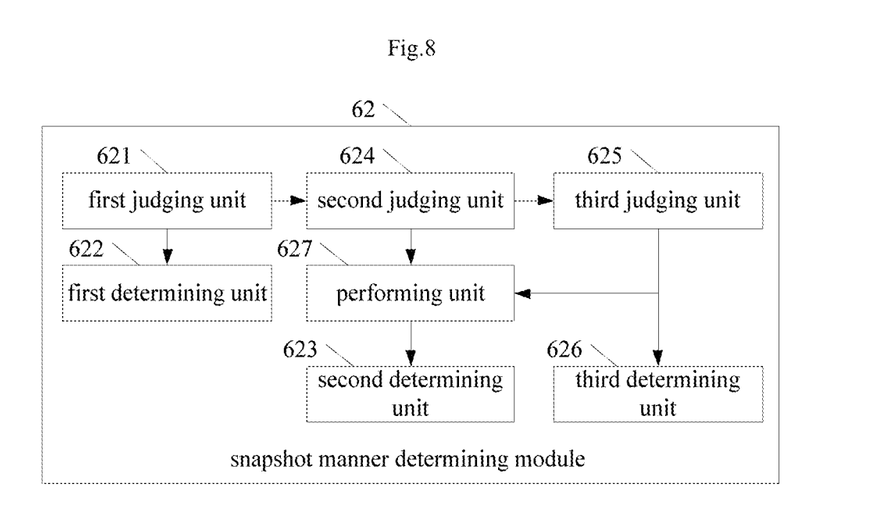
FIG. 8 is a structural schematic diagram of a snapshot manner determining module in another distributed block storage system according to an embodiment of the present disclosure.

Optionally, as shown in FIG. 8, the snapshot manner determining module 62 may further include: a second judging unit 624 configured to determine whether the preset parameter value of the number of read operations and the number of read/write operations is larger than a second preset threshold value, wherein the second preset threshold value is less than the first preset threshold value; a third judging unit 625 configured to determine whether a front-end load value is larger than a preset load threshold value, when the preset parameter value of the number of read operations and the number of read/write operations is larger than the second preset threshold value, wherein the front-end load value is a load value of a data server storing the data block; a third determining unit 626 configured to determine the target snapshot manner as Copy On Write, when the front-end load value is less than or equal to the preset load threshold value; and a performing unit 627 configured to perform a step of determining the target snapshot manner as Redirect On Write, when the front-end load value is larger than the preset load threshold value or when the preset parameter value of the number of read operations and the number of read/write operations is less than or equal to the second preset threshold value.

Figure 9:
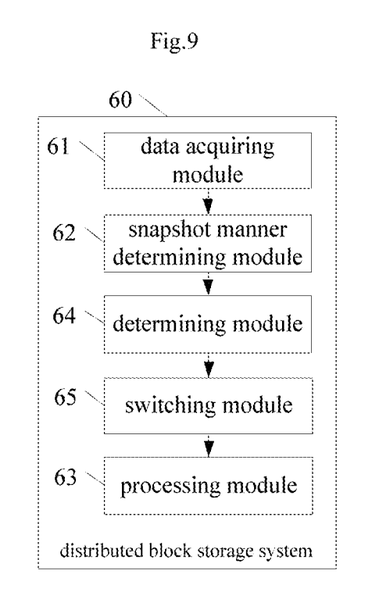
FIG. 9 is a structural schematic diagram of another distributed block storage system according to an embodiment of the present disclosure.

Optionally, as shown in FIG. 9, the distributed block storage system 60 may further include: a determining module 64 configured to determine whether a present snapshot manner corresponds to the target snapshot manner; and a switching module 65 configured to switch the present snapshot manner to the target snapshot manner, when the present snapshot manner does not correspond to the target snapshot manner.

Optionally, the snapshot operation may include any one of the snapshot create operation, read operation, write operation, rollback operation, and snapshot delete operation.

It should be noted that the present distributed block storage system of the embodiment may be the same distributed block storage system in any of the embodiments shown in FIGS. 1 to 5. Any implementation of the distributed block storage system described in any of the embodiments shown in FIGS. 1 to 5 may be implemented in the present distributed block storage system, and will not be repeated herein.

It should be understand by those ordinary skilled in the art that all or a part of the steps implementing the method of the embodiments may be realized through hardware correlated to program instructions, the program may be stored in a computer readable medium, when the program is executed, the following steps are performed: acquiring the number of read operations and the number of read/write operations for a data block in a distributed block storage system; determining a target snapshot manner based on the number of read operations and the number of read/write operations, wherein the target snapshot manner includes Copy On Write or Redirect On Write; and performing a snapshot operation on the data block in the distributed block storage system based on the target snapshot manner.

Optionally, the step of determining target snapshot manner based on the number of read operations and the number of read/write operations includes: determining whether a preset parameter value of the number of read operations and the number of read/write operations is larger than or equal to a first preset threshold value, wherein the preset parameter value is a ratio of the number of read operations and the number of read/write operations or a difference between the number of read operations and the number of read/write operations; determining the target snapshot manner as Copy On Write, when the preset parameter value of the number of read operations and the number of read/write operations is larger than or equal to the first preset threshold value; and determining the target snapshot manner as Redirect On Write, when the preset parameter value of the number of read operations and the number of read/write operations is less than the first preset threshold value.

Optionally, before the step of determining the target snapshot manner as Redirect On Write, the method further includes: determining whether the preset parameter value of the number of read operations and the number of read/write operations is larger than a second preset threshold value, wherein the second preset threshold value is less than the first preset threshold value; determining whether a front-end load value is larger than a preset load threshold value, when the preset parameter value of the number of read operations and the number of read/write operations is larger than the second preset threshold value, wherein the front-end load value is load value of a data server storing the data block; determining the target snapshot manner as Copy On Write, when the front-end load value is less than or equal to the preset load threshold value; and performing the step of determining the target snapshot manner as Redirect On Write, when the front-end load value is larger than the preset load threshold value or when the preset parameter value of the number of read operations and the number of read/write operations is less than or equal to the second preset threshold value.

Optionally, before the step of performing the snapshot operation on the data block in the distributed block storage system based on the target snapshot manner, the method further includes: determining whether a present snapshot manner corresponds to the target snapshot manner; and switching the present snapshot manner to the target snapshot manner, when the present snapshot manner does not correspond to the target snapshot manner.

Optionally, the snapshot operation includes any one of the snapshot create operation, read operation, write operation, rollback operation, and snapshot delete operation.

Those of ordinary skill in the art will appreciate that all or some steps of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or step may be performed cooperatively by several physical components. Some or all physical components may be implemented as software executed by a processor, such as a digital signal processor or microprocessor, or implemented as hardware, or implemented as an integrated circuit, such as an application specific integrated circuit. Such software may be distributed on a computer readable medium which may include a computer storage medium (or non-transitory medium). As is well known to those of ordinary skill in the art, the term of computer storage medium includes volatile and nonvolatile, removable and non-removable medium implemented in any method or technology for storing information, such as computer readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer.

The foregoing descriptions are optional embodiments of the present disclosure, it should be noted that improvements and modifications are easily occurred to those ordinary skilled in the art without departure from the principles of the present disclosure, the improvements and modifications are deemed as falling within the protection scope of the present disclosure.

INDUSTRIAL APPLICABILITY

The embodiments of the present disclosure may be implemented during snapshots of the distributed storage system, when the data block is being read mostly, performing snapshot operation on the data block with Copy On Write; and when the data block is being write mostly, performing snapshot operation on the data block with Redirect On Write, therefore, the write-in performance, rollback performance, and read performance can be all good.

The invention claimed is:

1. A method for processing snapshots, which is applied to a distributed block storage system, the method comprising:
    acquiring number of read operations and number of read/write operations for data block in the distributed block storage system;
    determining a target snapshot manner based on the number of read operations and the number of read/write operations, wherein the target snapshot manner comprises Copy On Write or Redirect On Write; and
    performing a snapshot operation on the data block in the distributed block storage system based on the target snapshot manner,
    wherein the step of determining the target snapshot manner based on the number of read operations and the number of read/write operations comprises:
    determining whether a preset parameter value of the number of read operations and the number of read/write operations is larger than or equal to a first preset threshold value, wherein the preset parameter value is a ratio of the number of read operations and the number of read/write operations or a difference between the number of read operations and the number of read/write operations;
    determining the target snapshot manner as Copy On Write, when the preset parameter value of the number of read operations and the number of read/write operations is larger than or equal to the first preset threshold value; and
    determining the target snapshot manner as Redirect On Write, when the preset parameter value of the number of read operations and the number of read/write operations is less than the first preset threshold value, and
    before the step of determining the target snapshot manner as Redirect On Write, the method further comprising:
    determining whether the preset parameter value of the number of read operations and the number of read/write operations is larger than a second preset threshold value, wherein the second preset threshold value is less than the first preset threshold value;
    determining whether a front-end load value is larger than a preset load threshold value, when the preset parameter value of the number of read operations and the number of read/write operations is larger than the second preset threshold value, wherein the front-end load value is a load value of a data server storing the data block;
    determining the target snapshot manner as Copy On Write, when the front-end load value is less than or equal to the preset load threshold value; and
    performing the step of determining the target snapshot manner as Redirect On Write, when the front-end load value is larger than the preset load threshold value or when the preset parameter value of the number of read operations and the number of read/write operations is less than or equal to the second preset threshold value.

2. The method of claim 1, before the step of performing the snapshot operation on the data block in the distributed block storage system based on the target snapshot manner, further comprising:
    determining whether a present snapshot manner corresponds to the target snapshot manner; and
    switching the present snapshot manner to the target snapshot manner, when the present snapshot manner does not correspond to the target snapshot manner.

3. The method of claim 1, wherein the snapshot operation comprises any one of snapshot create operation, read operation, write operation, rollback operation, and snapshot delete operation.

4. A distributed block storage system, comprising:
    a processor configured to execute computer-executable instructions comprising:
    a data acquiring module configured to acquire number of read operations and number of read/write operations for data block in the distributed block storage system;
    a snapshot manner determining module configured to determine a target snapshot manner based on the number of read operations and the number of read/write operations, wherein the target snapshot manner comprises Copy On Write or Redirect On Write; and
    a processing module configured to perform a snapshot operation on the data block in the distributed block storage system based on the target snapshot manner,
    wherein the snapshot manner determining module comprises:
    a first judging unit configured to determine whether a preset parameter value of the number of read operations and the number of read/write operations is larger than or equal to a first preset threshold value, wherein the preset parameter value is a ratio of the number of read operations and the number of read/write operations or a difference between the number of read operations and the number of read/write operations;
    a first determining unit configured to determine the target snapshot manner as Copy On Write, when the preset parameter value of the number of read operations and the number of read/write operations is larger than or equal to the first preset threshold value; and
    a second determining unit configured to determine the target snapshot manner as Redirect On Write, when the preset parameter value of the number of read operations and the number of read/write operations is less than the first preset threshold value, and
    wherein the snapshot manner determining module further comprises:
    a second judging unit configured to determine whether the preset parameter value of the number of read operations and the number of read/write operations is larger than a second preset threshold value, wherein the second preset threshold value is less than the first preset threshold value;

a third judging unit configured to determine whether a front-end load value is larger than a preset load threshold value, when the preset parameter value of the number of read operations and the number of read/write operations is larger than the second preset threshold value, wherein the front-end load value is a load value of a data server storing the data block;

a third determining unit configured to determine the target snapshot manner as Copy On Write, when the front-end load value is less than or equal to the preset load threshold value; and a performing unit configured to perform a step of determining the target snapshot manner as Redirect On Write, when the front-end load value is larger than the preset load threshold value or when the preset parameter value of the number of read operations and the number of read/write operations is less than or equal to the second preset threshold value.

5. The distributed block storage system of claim 4, further comprising:

a determining module configured to determine whether a present snapshot manner corresponds to the target snapshot manner; and a switching module configured to switch the present snapshot manner to the target snapshot manner, when the present snapshot manner does not correspond to the target snapshot manner.

6. The distributed block storage system of claim 4, wherein the snapshot operation comprises any one of snapshot create operation, read operation, write operation, rollback operation, and snapshot delete operation.

7. A non-transitory computer readable medium storing computer executable instructions therein, when the computer executable instructions are executed, performing the method of claim 1.

8. The method of claim 1, before the step of performing the snapshot operation on the data block in the distributed block storage system based on the target snapshot manner, further comprising:

determining whether a present snapshot manner corresponds to the target snapshot manner; and switching the present snapshot manner to the target snapshot manner, when the present snapshot manner does not correspond to the target snapshot manner.

9. The method of claim 1, wherein the snapshot operation comprises any one of snapshot create operation, read operation, write operation, rollback operation, and snapshot delete operation.

10. The distributed block storage system of claim 4, further comprising:

a determining module configured to determine whether a present snapshot manner corresponds to the target snapshot manner; and a switching module configured to switch the present snapshot manner to the target snapshot manner, when the present snapshot manner does not correspond to the target snapshot manner.

11. The distributed block storage system of claim 4, wherein the snapshot operation comprises any one of snapshot create operation, read operation, write operation, rollback operation, and snapshot delete operation.

* * * * *